H. D. FLEGEL.
ADJUSTABLE DIAL SCALE.
APPLICATION FILED OCT. 16, 1911.
1,028,700.
Patented June 4, 1912.
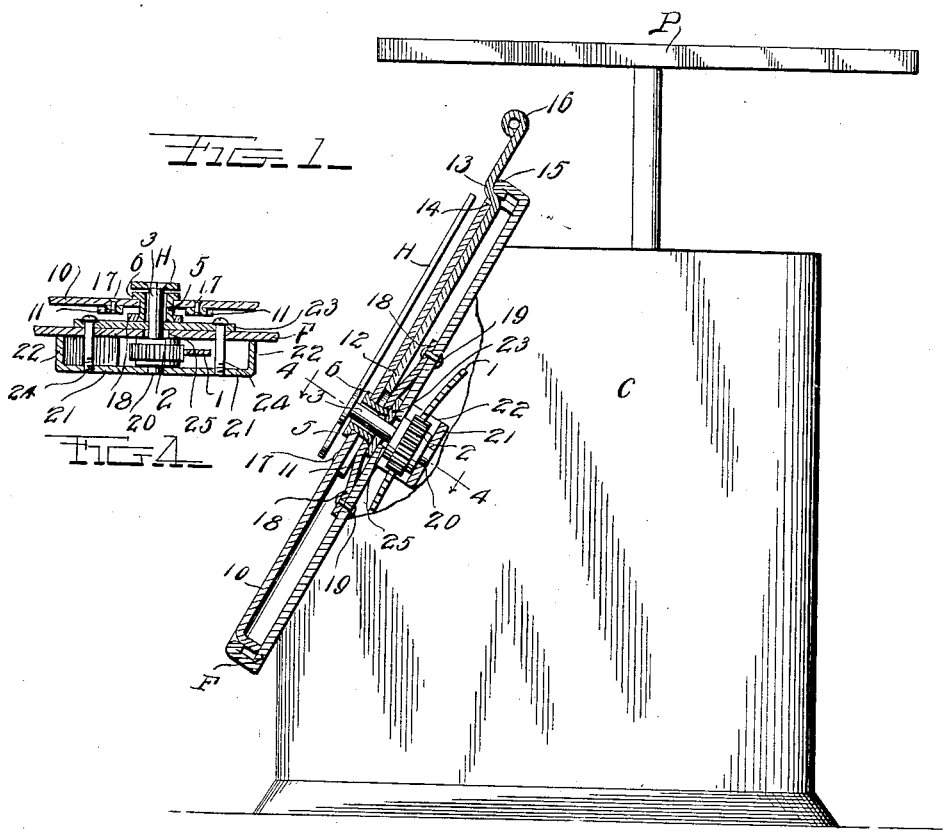
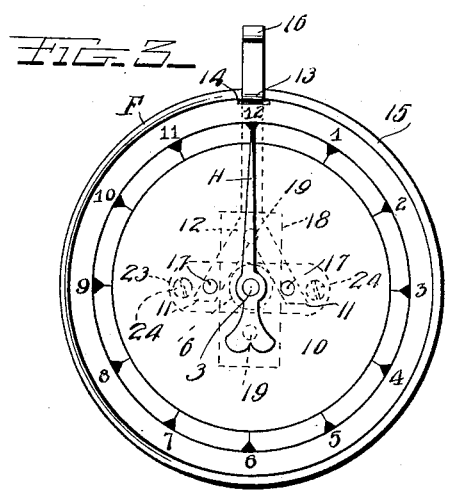
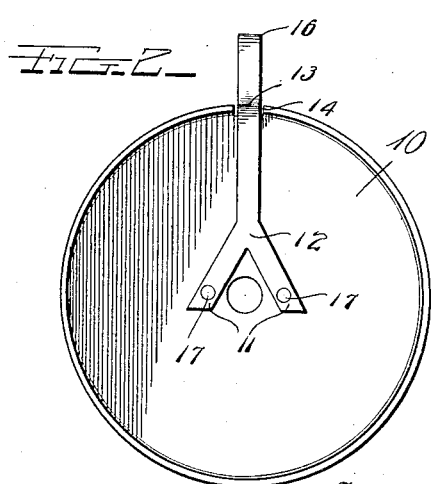
Witnesses
J. R. Pierce
N. L. Collamer
Inventor
H. D. Flegel.
by H. B. Willson & Co.
Attorneys

UNITED STATES PATENT OFFICE.

HARRISON D. FLEGEL, OF RACINE, WISCONSIN, ASSIGNOR TO EDWARD J. SCHOWALTER, OF RACINE, WISCONSIN.

ADJUSTABLE DIAL-SCALE.

1,028,700. Specification of Letters Patent. Patented June 4, 1912.

Application filed October 16, 1911. Serial No. 654,931.

*To all whom it may concern:*

Be it known that I, HARRISON D. FLEGEL, a citizen of the United States, residing at Racine, in the county of Racine and State of Wisconsin, have invented certain new and useful Improvements in Adjustable Dial-Scales; and I do declare the following to be a full, clear, and exact description of the invention, such as will enable others skilled in the art to which it appertains to make and use the same.

This invention relates to measuring instruments, and more especially to scales; and the object of the same is to produce improved means for mounting the dial movably over the face of the scale-body.

This object is carried out by the construction hereinafter more fully described and claimed and shown in the drawings wherein—

Figure 1 is a side elevation of the scale casing and pan, with the former broken away to show the face plate and this invention in section; Fig. 2 is a rear elevation of the dial and the adjusting plate which is riveted thereto; Fig. 3 is a plan view of the movable dial superimposed over the face plate, showing my invention and illustrating in dotted lines how the handle is secured to the dial; Fig. 4 is a cross section on the line 4—4 of Fig. 1.

Referring now to the drawings, the letter C designates the casing of a scale of any type whose details of construction form no essential part of the present invention, and F is the circular face plate thereof carrying a dial over which moves the hand H when a weight is placed upon the pan P. Scales of this kind have hitherto been devised wherein the dial proper was movable upon the face plate so that when a commodity was to be weighed within a receptacle, the latter was placed first upon the pan which moved the hand forward from zero, then the dial was set forward so that its zero mark stood opposite this position of the hand, and then the commodity was placed within the receptacle so that the hand was forced forward from its second position a distance which would give the true weight of the commodity irrespective of the weight of the receptacle.

My present invention is designed for use in connection with any scale whose dial must be moved upon its face plate, either for the purpose just described or for any other purpose.

In the specific type of scale mechanism herewith illustrated, the depression of the pan P moves a rack bar 1 which engages a gear wheel 2 fast on an arbor 3 carrying the hand H at its front end; and this arbor is journaled at its rear end at 20 in a bracket 21 which is spaced some distance to the rear of the face plate F by its feet 22, and also in a bearing plate 23 which is secured to the front of said face plate by screws 24 passing through both plates and threaded into the bracket as shown. Between these members the arbor passes loosely through a hole 25 in the face plate, and forward of the bearing plate it passes loosely through a tubular bushing 5. The rear end of the latter is riveted through an upright strip 18 which extends across the bearing plate 23 and has its upper and lower ends secured as at 19 to the face plate, while the front end of the bushing is flanged or upset as at 6 some little distance forward of the strip 18, and in the space between these elements is located the dial 10, whose face is inscribed around its edge with suitable numerals. Said dial is itself mounted upon the lower extremities 11 of an A shaped plate 12 which extends upward, thence forward as at 13 through a notch 14 in the edge of the dial, and thence upward and outward over the rim 15 of the face plate into a handle 16 which is in convenient reach of the operator at any time, and which may be revolved completely around the edge of the face plate when desired. The lower extremities 11 of the plate are riveted as at 17 to the dial 10 at either side of its center bearing, and the latter closely surrounds and finds its support upon the bushing and is therefore not in contact with the arbor of the hand. With this construction the commodity being weighed causes the scale mechanism to rotate the hand H through a partial revolution, and this rotation finds no resistance in any friction between the arbor and the loosely mounted dial, and the latter may be set at any point desired, as for instance when the scale is used in the manner above set forth. The setting of the dial forward or backward simply turns it around the bushing, and therefore throws no friction upon the arbor of the hand, and hence the specific construction is such that the hand and its arbor are to the greatest degree independent of the dial and its support and the mechanism by which it may be set. The elbow within the plate 12 may move with some little friction along the rim 15 around the face plate, so that the dial will remain set in any position where the operator may desire it.

The parts are by preference entirely of metal, and details may be amplified or changed without sacrificing the principle of my invention.

What is claimed as new is:

1. The combination with a scale mechanism including a hand and its arbor, and a casing for such mechanism including a face plate having a surrounding flange and a tubular bushing around said arbor upset at its outer end in rear of the hub of the hand; of a dial loosely mounted on said bushing between its upset end and the face plate and having a notch in its upper edge, and a plate forked at its lower end and riveted to the dial astride its bearing, the plate extending thence upward through said notch with its end bent forward around the flange of the face plate and projecting outward into a handle.

2. The combination with a scale mechanism including a hand and its arbor, and a casing for such mechanism including a face plate having a surrounding flange and a tubular bushing around said arbor upset at its outer end in rear of the hand; of a dial loosely mounted on said bushing between its upset end and the face plate, and a plate riveted at its lower end to the dial and extending thence upward and bent forward in an elbow making frictional contact with the flange of the face plate and projecting thence radially outward into a handle.

3. The combination with a scale mechanism including a face plate having a hole through its center, a bracket behind this plate having feet spacing it therefrom, a bearing plate in front of the face plate, screws passing through both plates and into the bracket, an arbor journaled in the latter and in the bearing plate and carrying the hand at its front extremity, the pan, and connections for turning the arbor by depression of the pan; of a strip riveted to the face plate and extending over the bearing plate, a bushing whose rear end is mounted in said strip, whose bore loosely surrounds the arbor and whose front end is upset, a dial movably mounted on said bushing between its ends, and means for manually setting the dial over the face plate.

In testimony whereof I have hereunto set my hand in presence of two subscribing witnesses.

HARRISON D. FLEGEL.

Witnesses:
JEROME A. GRAULIK,
EDWARD J. SCHOWALTER.

---

Copies of this patent may be obtained for five cents each, by addressing the "Commissioner of Patents, Washington, D. C."